(12) United States Patent
Eskritt et al.

(10) Patent No.: US 7,180,256 B2
(45) Date of Patent: Feb. 20, 2007

(54) ELECTRONICALLY CONTROLLED POWER STEERING SYSTEM FOR VEHICLES AND METHOD AND SYSTEM FOR MOTOR CONTROL

(75) Inventors: James B Eskritt, Halifax (CA); Joel E Kuehner, Upper Sackville (CA); Hideki Jounokuchi, Kashihara (JP); Yoshiyuki Yamazaki, Kashihara (JP)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 11/228,658

(22) Filed: Sep. 16, 2005

(65) Prior Publication Data

US 2006/0012324 A1    Jan. 19, 2006

Related U.S. Application Data

(62) Division of application No. 10/425,091, filed on Apr. 28, 2003, now Pat. No. 6,995,679.

(60) Provisional application No. 60/377,296, filed on May 1, 2002, provisional application No. 60/376,617, filed on Apr. 30, 2002.

(51) Int. Cl.
*H02K 21/00* (2006.01)

(52) U.S. Cl. .................. 318/254; 318/138; 318/439; 388/933

(58) Field of Classification Search ........... 318/254, 318/138, 439, 256, 139, 809; 388/933, 917, 388/812, 813, 820; 307/646; 363/13
See application file for complete search history.

(56) References Cited

U.S. PATENT DOCUMENTS

| | | | |
|---|---|---|---|
| 4,584,507 A * | 4/1986 | Taylor | ........... 388/813 |
| 5,505,275 A | 4/1996 | Phillips | |
| 5,659,473 A | 8/1997 | Noro et al. | |
| 5,675,699 A | 10/1997 | Yamamoto et al. | |

(Continued)

FOREIGN PATENT DOCUMENTS

EP    0 987 163    3/2000

(Continued)

OTHER PUBLICATIONS

International Search Report dated Sep. 28, 2006.

*Primary Examiner*—Karen Masih
(74) *Attorney, Agent, or Firm*—Ostrolenk, Faber, Gerb & Soffen, LLP

(57) ABSTRACT

A power steering device capable of obtaining a high rotary speed in the medium low torque range of an electric motor without incurring a drastic increase in manufacturing cost. The power steering device generates an auxiliary steering power by oil pressure that is generated by a pump which is driven by an electric power motor. The electric motor is a triple-phase brushless motor, with its angle of rotation being detected by the Hall sensors. The field coils are provided with the electric current from a drive circuit which is driven by a drive signal from the motor drive control part. The motor drive control part controls the electric motor by PWM control in the low medium speed rotation range and controls the electric motor by phase advance angle control, with PWM duty at 100 percent, in the medium high speed range.

28 Claims, 11 Drawing Sheets

U.S. PATENT DOCUMENTS

| | | | |
|---|---|---|---|
| 5,739,650 A | 4/1998 | Kimura et al. | |
| 5,787,376 A | 7/1998 | Nishino et al. | |
| 5,829,547 A | 11/1998 | Fujii et al. | |
| 6,026,926 A | 2/2000 | Noro et al. | |
| 6,032,091 A | 2/2000 | Noro et al. | |
| 6,034,493 A | 3/2000 | Boyd et al. | |
| 6,034,494 A | 3/2000 | Kiamine et al. | |
| 6,092,012 A | 7/2000 | Shimizu | |
| 6,129,172 A | 10/2000 | Yoshida et al. | |
| 6,250,418 B1 | 6/2001 | Shimizu | |
| 6,266,591 B1 | 7/2001 | Wilson-Jones et al. | |
| 6,332,108 B1 | 12/2001 | Hirasago | |
| 6,390,229 B1 | 5/2002 | Kaji | |
| 6,392,418 B1 | 5/2002 | Mir et al. | 324/503 |
| 6,400,108 B1 | 6/2002 | Chen et al. | |
| 6,427,105 B1 | 7/2002 | Matsushita | |
| 6,549,871 B1 | 4/2003 | Mir et al. | 702/145 |
| 6,564,140 B2 | 5/2003 | Ichikawa et al. | |
| 6,566,829 B1 | 5/2003 | Naidu et al. | 318/432 |
| 6,580,235 B2 | 6/2003 | Laurent | |
| 6,650,073 B2 | 11/2003 | Kawabata | |
| 6,687,590 B2 | 2/2004 | Kifuku et al. | |
| 6,694,287 B2 | 2/2004 | Mir et al. | 702/183 |
| 2002/0105335 A1 | 8/2002 | Mir et al. | 324/503 |
| 2002/0116105 A1 | 8/2002 | Chen et al. | |
| 2003/0046028 A1 | 3/2003 | Mir et al. | 702/183 |
| 2003/0178245 A1 | 9/2003 | Takagi | |
| 2003/0184170 A1 | 10/2003 | Kurnia et al. | 310/68 B |
| 2004/0007998 A1 | 1/2004 | Yasohara et al. | |
| 2004/0095089 A1 | 5/2004 | Collier-Hallman | 318/567 |

FOREIGN PATENT DOCUMENTS

| | | |
|---|---|---|
| EP | 1 235 340 A2 | 8/2002 |
| GB | 2 305 033 | 3/1997 |
| JP | 2000/134969 | 5/2000 |
| WO | WO 96/01521 | 1/1996 |

* cited by examiner

ELECTRONICALLY CONTROLLED POWER STEERING SYSTEM FOR VEHICLES AND METHOD AND SYSTEM FOR MOTOR CONTROL

CROSS REFERENCE TO RELATED APPLICATION

This is a divisional of U.S. patent application Ser. No. 10/425,091 filed Apr. 28, 2003 now U.S. Pat. No. 6,995,679 and entitled ELECTRONICALLY CONTROLLED POWER STEERING SYSTEM FOR VEHICLE AND METHOD FOR MOTOR CONTROL, which claims the benefit and priority of U.S. Provisional Application No. 60/377,296 filed May 1, 2002, and entitled ELECTRONICALLY CONTROLLED POWER STEERING SYSTEM FOR VEHICLE, and U.S. Provisional Application No. 60/376,617 filed Apr. 30, 2002 and entitled "SYSTEM AND METHOD FOR CONTROLLING ELECTRIC MOTOR WITH VARIABLE PHASE ADVANCE/CONDUCTION ANGLE" the entire disclosures of each of which are incorporated herein by reference.

BACKGROUND OF THE INVENTION

1. Field of the Invention

The present invention relates to electrical motor drives and, in particular, to electric motors driven by switched converters which convert a dc potential to one or more phases of pulsed current to drive the motor. The motor can be, for example, a brushless dc motor having Hall sensors to control the commutation.

This invention further relates to a power steering device that generates auxiliary steering power for driving to the steering mechanism of a vehicle by means of the oil pressure that is generated by a pump which is driven by electric power.

2. Technology According to Prior Art

FIG. 1 shows a typical three phase motor drive from a dc bus. The motor may be a brushless DC motor having a permanent magnet rotor and a stator comprising stator coils fed with switched pulsed phase drive signals. The dc bus voltage is provided to an inverter 100 comprising three half bridges comprising transistors (e.g., MOSFETs, IGBTs, bipolar devices) gated by signals AH, AL, BH, BL and CH, CL. The high and low side devices are each connected in series across the bus and the output of each device comprises one of the three phases, U, V and W. Each of the switching devices is controlled by a controller 200, which receives Hall signals controlling the commutation times from the electric motor 300. The gate drive signals AH, AL, BH, BL and CH, CL are provided to the respective switches of the inverter 100.

In a typical motor drive, shown, for example in FIG. 2, a Hall signal is provided from the motor for each phase, one of which is shown. Only one of each of the gate drive high and low signals is shown. In a typical application, the Hall signals provide a signal for controlling the switching of the switches in the inverter and thus the motor commutation. A typical motor drive is shown in FIG. 2 having a 120° conduction angle. As shown, the gate drives can be pulse width modulated (PWM) as shown by the low gate drive signal in FIG. 2. The gate drive signal switch events occur when the Hall transitions occur and any phase advance of the gate drive signal is determined solely by the physical placement of the position of the Hall effect sensors in the motor. The conduction angle is forced to be 120° or 180°. The effective voltage at the outputs of the half bridges is controlled by varying the duty cycle of the PWM. The pulse width modulation may be done on the low side or the high side or on both the high side and the low side. In FIG. 2, only one phase is shown. The other two phases are shifted by 120°.

FIG. 3 shows another example of a typical motor drive having 180° conduction angle. Similarly, the high or low side signals can be pulse width modulated or both can be pulse width modulated.

In the past, if a phase advance of a gate drive signal was desired, this was obtained solely by the physical placement of the position Hall effect sensors in the motor. That is, to obtain a phase advance, the position of the sensor in the motor would be moved forward by a certain number of degrees depending upon the desired phase advance. This phase advance is fixed and not electrically variable.

An object of the present invention is to provide a means for achieving a variable phase advance and/or conduction angle requiring no mechanical changes to the motor to obtain phase advance and change the conduction angle, thereby resulting in improved motor control.

It is a further object of the invention to provide an improved electric power steering system for a vehicle.

A power steering device that assists the operation of the steering wheel of a vehicle by supplying operating oil from the oil pump to the power cylinder that is joined to the steering mechanism has been known. The oil pump is driven by an electric motor, with the auxiliary steering power which is in conformity with the speed of the motor rotation being generated by a power cylinder.

Into the steering shaft, a torsion bar that generates torsion which is in conformity with the direction and size of the steering torque which has been provided by the steering wheel and an oil pressure control valve which changes its opening size in conformity with the direction and the size of the torsion of the torsion bar are incorporated. This oil pressure control valve is provided in the oil pressure system between the oil pump and the power cylinder and it causes an auxiliary steering power which is in conformity with the steering torque to be generated from the power cylinder.

The drive control of the electric power motor is carried out on the basis of the steering angle speed of the steering wheel. The steering angle speed is obtained on the basis of the output of the steering angle sensor that has been provided in connection with the steering wheel, and the target rotary speed of the electric power motor is set based on this steering angle rate. Voltage is supplied to the electric motor in such that this target rotary speed may be achieved.

As the electric motor, a triple-phase brushless motor is ordinarily used. The triple-phase brushless motor comprises a stator which has field coils for the U phase, the V phase and the W phase, a rotor with a fixed permanent magnet that receives the repulsive magnetic field from the field coils and Hall sensors for detecting the rotation position of this rotor. Three Hall sensors are provided at an interval of 120 degrees as an electric angle in conformity with the U phase, the V phase and the W phase.

The triple-phase brushless motor is driven in accordance with the conventional 120 degree power system in the ordinary case. This 120 degree power system is shown in FIG. 13. The Hall signals that are outputted by the Hall sensors of the U phase, the V phase and the W phase deviate from each other by 120 degrees in phase. The electrical power is passed during a period corresponding to an electric angle of 120 degrees to the U phase, the V phase and the W phase in turn so as to synchronize with the Hall signals of the U phase, the V phase and the W phase. It becomes possible to change the rotary speed of the brushless motor by the PWM (pulse width modulation) control of the supply of the drive current to each field coil during the electricity-conducting period of 120 degrees.

FIG. 14 shows the relationship between the rotary speed of the rotor and the output torque in the triple-phase brushless motor. As is shown in FIG. 14, it is known that the output torque decreases along with an increase in the rotary speed. As can be understood from the formula relating to the motor as shown in (1) below, if the rotary speed of the motor ($\omega$) increases, the electric current I that flows to the motor decreases along with an increase in the motor-generated induced voltage $k\omega$, also known as the back emf, with a result that the output torque that is proportional to the electric current I becomes smaller.

$$V=IR+L\ di/dt+k\omega \qquad (1)$$

where L=motor inductance di/dt=rate of change of current and V indicates the voltage impressed to the motor, I is the electric current that flows to the motor, R is the electric resistance of the motor, K is a constant and $\omega$ indicates the speed of rotation of the motor.

SUMMARY OF THE INVENTION

The invention relates to a system and method for achieving a variable phase advance and/or a variable conduction angle in a motor drive system.

It is a further object of the invention to provide a system and method that uses any of variable phase advance, variable conduction angle and pulse width modulation to suitably regulate the speed of an electric motor to obtain a desired torque characteristic.

The invention provides advantages in that increasing the phase advance and/or conduction angle gives a higher achievable speed for any given torque. That is, the power is increased. Further, increasing the conduction angle reduces torque ripple.

The above and other objects of the invention are achieved by a method for controlling an electric motor having at least one sensor output for determining a switching instant for a switch of a switching converter controlling a conduction angle determining a conduction time during a revolution of the motor, the method comprising; receiving the sensor output; and advancing a switching-on time of a switch of the switching converter connecting a d-c bus voltage to a motor phase drive input by a phase angle prior to the next sensor output determining the switching instant.

In recent years, there has been a demand for a greater rotary speed in the medium low torque range of the triple-phase brushless motor. In order to meet such a demand, however, there will inevitably have to be a drastic rise in the cost as it will become necessary to review the control system of the triple-phase brushless motor and re-evaluate the design of the triple-phase motor itself. Accordingly, a purpose of this invention lies in offering a power steering device which is capable of obtaining a high rotary speed in the medium low torque range of the electric motor and which does not bring about a drastic rise in manufacturing costs.

The invention for achieving the aforementioned objective is a power steering device that generates an auxiliary steering power by oil pressure that is generated by a pump which is driven by an electric motor, the motor having a conduction angle during which electrical power is provided to at least one motor phase, the power steering device comprising a rotary angle detector for detecting the rotary angle of said electric motor, a steering angle speed sensor for detecting a steering angle speed of a steering operating member, a drive target value rotational speed setting device for setting a drive target value rotational speed of said electric motor in relation to an output signal of the steering angle speed sensor, a drive signal generator for producing a drive signal for driving said electric motor and an angle setting device for determining a phase advance angle of the drive signal with respect to the rotary angle that is detected by said rotary angle detector on the basis of the drive target value rotational speed which is set by said drive target value rotational speed setting device, thereby changing the conduction angle.

According to the construction described above, the phase advance angle of the drive signal is set in conformity with the drive target value rotational speed of the electric power motor (such as a brushless motor), with the conduction angle being changed accordingly.

If, for instance, the electric motor is a triple-phase brushless motor, with said triple-phase brushless motor being driven according to the 120 degree conduction angle method, the timing for the start of the electricity passing to the field coils of the U phase, the V phase and the W phase is variably set for the phase of the output signal of the rotary angle detector (such as a Hall sensor) corresponding to the U phase, the V phase and the W phase. As it becomes possible to increase the electric current supplied (the electricity passing time or conduction angle) to the electric motor by setting a comparatively large phase advance angle for the drive target value for the high speed rotation range, the motor generating voltage (back emf) becomes small, thereby increasing the output torque.

According to this invention, it becomes possible to increase the rotary speed in the medium low torque ranges without drastically changing the design of the motor or the design of the system as a whole. Accordingly, there will be no drastic increase in the cost.

Since it is possible to exercise control so as to set a suitable phase advance angle (the minimum phase advance angle required) for the required motor rotary speed, it becomes possible to control the major problems in the control of the phase advance angle (such as a reduction in permanent magnetism or lowering of efficiency).

It is also conceivable to effect PWM control for passing electricity in a period of a certain phase advance angle by keeping the phase advance angle of the drive signal constant. In such a case, the heat loss in the switching means (such as a field effect transistor) for realizing the PWM control becomes a problem. According to this invention, it is not that PWM control is carried out during the period of the phase advance angle but that the period of power passing is varied by varying the phase advance angle, with a consequence that there is no need to consider an increase in the switching loss, and it becomes possible to control any possible increase in the heat loss.

Further, according to the invention, the phase advance angle setting means sets a certain fixed phase advance angle irrespective of said drive target value at the time when the electricity passage to the electric motor is in an unsaturated state but sets the phase advance angle on the basis of the drive target value which is set by the the drive target setting device at the time when power passing to the electric motor is saturated.

According to this construction, a phase advance angle which is in conformity with the drive target value can be set only after the 120 power passage has been saturated, (for example, it may be set at zero degrees) and, by carrying out PWM control within the power passing period of 120 degrees, for instance, both the low speed rotation control and the medium-speed rotational control of the power motor can be controlled. Once the 120 degree conduction angle period has been saturated (100% PWM duty cycle), further motor control is accomplished by varying the phase advance angle, with the motor being operated in the phase advance region in a saturated state, i.e., 100% PWM duty cycle.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings in which.

DETAILED DESCRIPTION OF THE INVENTION

Figure 4:
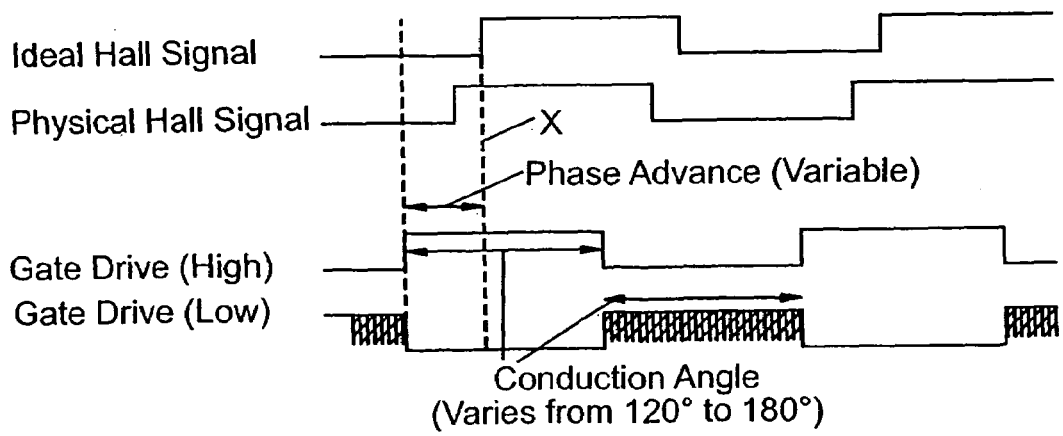
FIG. 4 shows a motor drive control scheme in accordance with the invention providing variable phase advance and/or conduction angle.

Turning now to FIG. 4, this figure shows gate drive high and gate drive low signals for one motor phase, as well as the ideal and physical Hall signals from the motor. The ideal Hall signal is placed such that if 120° conduction angle were used with 0° phase advance, the switching instants would occur at the same time as the Hall signal transitions. This is shown in FIG. 4 by the dashed line x. If no phase advance is provided, the switching instants for the high drive signal would coincide with the rising edge of the ideal Hall signal. The physical Hall signal may be offset (advanced) from the ideal Hall signal by some amount, which can be 0°, or some value greater than 0°. An exemplary physical Hall signal is shown in FIG. 4. The variable phase advance (from the ideal Hall signal) is indicated in FIG. 4. FIG. 4 shows that the gate drive high signal is switched on some variable phase amount prior to the ideal Hall transition and some variable amount prior to the physical Hall signal transition.

Figure 5:
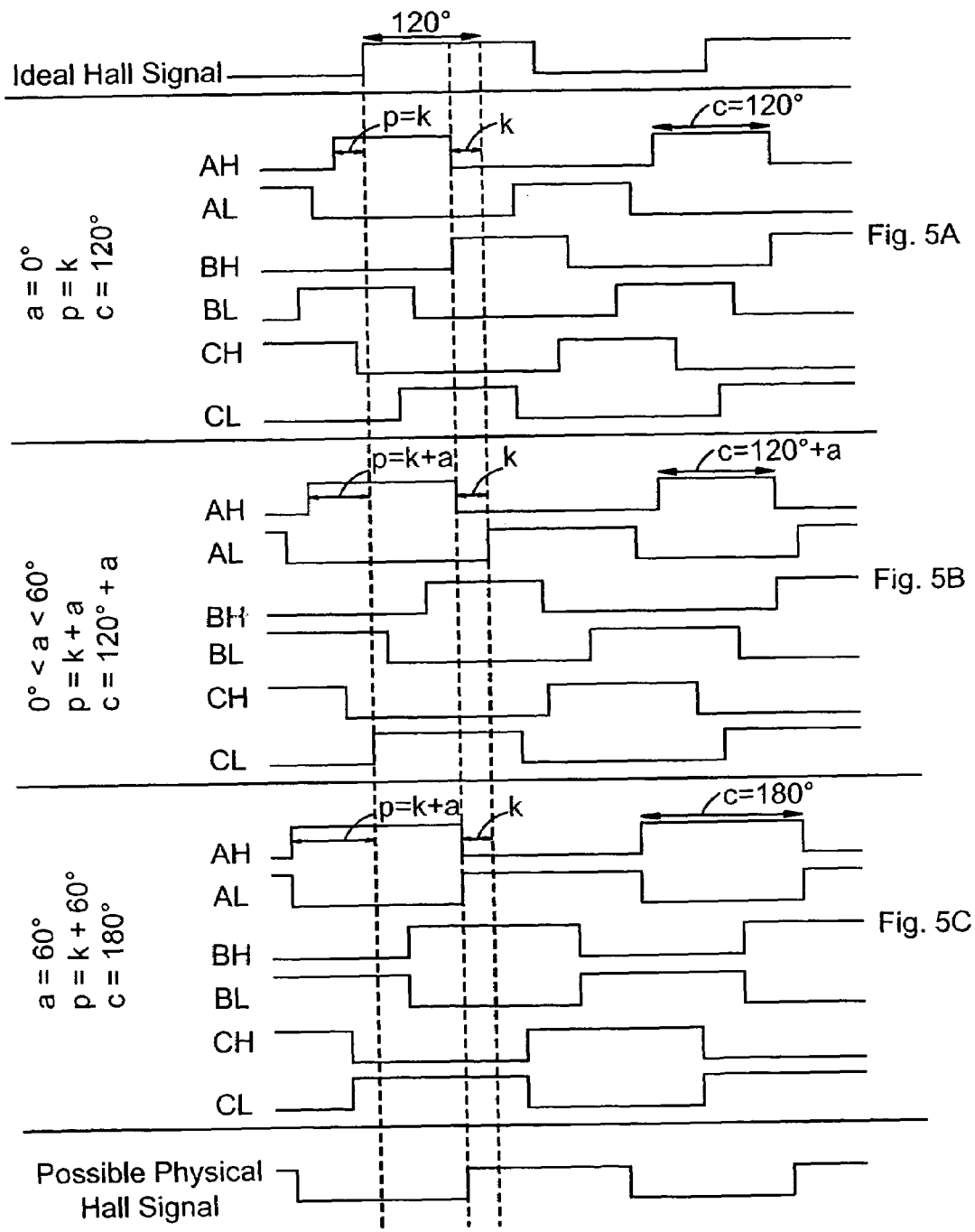
FIG. 5 shows several timing charts for motor drive signals for various cases of variable phase advance, fixed phase advance and conduction angle.

As shown in FIGS. 4 and 5, the conduction angle may vary between 120° and 180°. The phase advance is variable. The phase advance and conduction angle may be independently adjustable although in practice a co-dependency is useful. In particular, a variable advance may be added to the conduction angle to provide an additional amount of conduction angle. Thus, the conduction angle equals 120° plus the amount of variable advance a in the scheme shown. The total phase advance p equals a fixed amount of advance k plus the variable advance a. Although the phase advance and conduction angle are shown as co-dependent in FIG. 4, they need not be. For example, a phase advance can be employed merely to shift the conduction period, but the conduction angle remains constant.

As shown in FIG. 4, the switching instants of the gate drive signals are not constrained to coincide with the Hall transitions. A software algorithm can place the switching instants arbitrarily relative to the Hall sensor edges. As also shown in FIG. 4, pulse width modulation may or may not be used depending upon the application. Adjusting the phase advance and/or conduction angle may be used to regulate the speed or current in certain situations, with or without PWM.

In order to provide the phase advance (which means the switching transition of the gate signal is before the Hall signal transition) a software algorithm can use the prior Hall transition to cause the advance prior to the next corresponding Hall signal transition.

As described previously, increasing phase advance and conduction angle provides a higher achievable speed for any given torque. That is, power is increased. The increase in conduction angle also reduces torque ripple.

The following data in Table I was recorded for a typical electric motor at 13.5 volts and 2.48 Nm torque.

TABLE 1

ALL NEW TEXT

| Phase Advance | Conduction Angle | | | | | | | | | | | |
|---|---|---|---|---|---|---|---|---|---|---|---|---|
| | 120° | | | 140° | | | 160° | | | 180° | | |
| | speed | current | efficiency | speed | current | efficiency | speed | current | efficiency | speed | current | efficiency |
| 0° | | | | | | | | | | | | |
| 5° | 2498 | 69.2 | 69.22 | | | | | | | | | |
| 10° | 2523 | 68.9 | 70.44 | | | | | | | | | |
| 15° | 2560 | 69.0 | 71.37 | | | | | | | | | |
| 20° | 2594 | 69.4 | 71.90 | | | | | | | | | |
| 25° | 2634 | 70.4 | 71.98 | 2790 | 74.1 | 72.48 | | | | | | |
| 30° | 2681 | 72.0 | 71.63 | 2880 | 75.0 | 73.87 | | | | | | |
| 35° | 2735 | 73.6 | 71.49 | 2954 | 76.2 | 74.58 | | | | | | |
| 40° | 2785 | 75.8 | 70.68 | 3036 | 78.0 | 74.88 | 2790 | 74.7 | 71.85 | | | |
| 45° | 2848 | 78.3 | 69.97 | 3129 | 80.1 | 75.15 | 3027 | 78.0 | 74.70 | | | |
| 50° | 2905 | 81.5 | 68.61 | 3241 | 82.9 | 75.21 | 3274 | 82.4 | 76.48 | | | |
| 55° | | | | 3342 | 86.4 | 74.41 | 3475 | 86.8 | 77.02 | | | |
| 60° | | | | | | | 3653 | 91.5 | 76.80 | 2742 | 73.2 | 72.11 |

TABLE 1-continued

ALL NEW TEXT

Conduction Angle

| | 120° | 140° | 160° | 180° | | |
|---|---|---|---|---|---|---|
| 65° | | | | 2975 | 76.1 | 75.21 |
| 70° | | | | 3219 | 80.5 | 76.93 |
| 75° | | | | 3425 | 85.4 | 77.15 |
| 80° | | | | 3676 | 91.9 | 76.95 |

In the Table I, speed is in RPM, current is in amperes(A) and efficiency is in percentage. The duty cycle is 100%, that is, there is 100% pulse width modulation (full on during conduction angle). The temperature was between 30 and 45° C. The entries not filled in are considered not useable due to poor efficiency.

The data in Table 1 was recorded in order to develop a relationship between phase advance and conduction angle that would result in useful motor characteristics. The data is useful for showing the trends in efficiency as phase advance and conduction angle are varied. As shown in the table, for increasing conduction angle, a higher phase advance results in greater efficiency. For conduction angles of 160°, the best efficiency occurs at phase advances of 40–60° (55° about optimal) whereas at 180°, best efficiency occurs at phase advances of 60–80° (75° about optimal). For 140° conduction angle, greatest efficiency occurs between 25 and 55° (50° about optimal). At 120° conduction angle, maximum efficiency is between 5° and 50° (25° about optimal).

Based upon Table 1, the following scheme can be chosen:
p=phase advance
c=conduction angle
k=fixed advance
a=variable advance (and additional conduction angle)

$p=k+a, k<p<(k+60°)$ $c=120°+a, 120°<c<180°$ $0°<a<60°$ p a k=15°
120° conduction: phase advance=k+0°=15°
140° conduction: phase advance=k+20°=35°
160° conduction: phase advance=k+40°=55°
180° conduction: phase advance=k+60°=75°

A fixed phase advance of k=15° was chosen based on Table 1 with the total advance being equal to the fixed advance plus the variable advance a. In this scheme, the variable advance is also equal to the additional conduction angle. The fixed advance shifts the conduction angle period, while the variable advance increases the conduction angle.

Reviewing the data in Table 1, it is observable that with this scheme and k=15°, for both 160° and 180° conduction, the system is at a maximum efficiency. At 120° and 140° conduction, the system is within one percent of maximum efficiency with k=15°.

The above scheme has the advantages that it is simple, it results in higher efficiency and it provides the possibility of placing the Hall sensor such that a number of switching instants will align with the Hall edges. This may improve the accuracy and simplicity of the software algorithm.

FIG. 5 shows several examples of the control scheme according to the present invention. In FIG. 5A, the variable advance equals 0°, the total phase advance equals the fixed phase advance k and the conduction angle equals 120°. In FIG. 5B, the variable phase advance is between 0 and 60°. The total phase advance equals the fixed advance k plus the variable advance a and the conduction angle equals 120° plus the variable advance a.

In FIG. 5C, the variable advance equals 60°, the total phase advance equals fixed advance k plus 60° and the conduction angle equals 180°. The ideal and possible physical Hall signals for a single phase are as shown at the top and bottom of FIG. 5, respectively.

By setting the fixed advance k, the result is that the turn off instants for each corresponding switch (for each conduction angle) is at the same point regardless of the amount of variable advance. That is, the turn off instant for switch AH is the same for each of the three conduction angles. Similarly, the turn off instant for the switches AL for each scheme is at the same time, likewise for the switches BH, BL, CH and CL. This means that the Hall effect sensors can be positioned as shown by the possible physical Hall signal shown at the bottom of the plot, so that turn off instants always align with a Hall transition. The same would be true of the two other phases. This simplifies the software algorithm for controlling the switching of the drive transistors in each half bridge, thus simplifying the software for controlling commutation.

Figure 6:
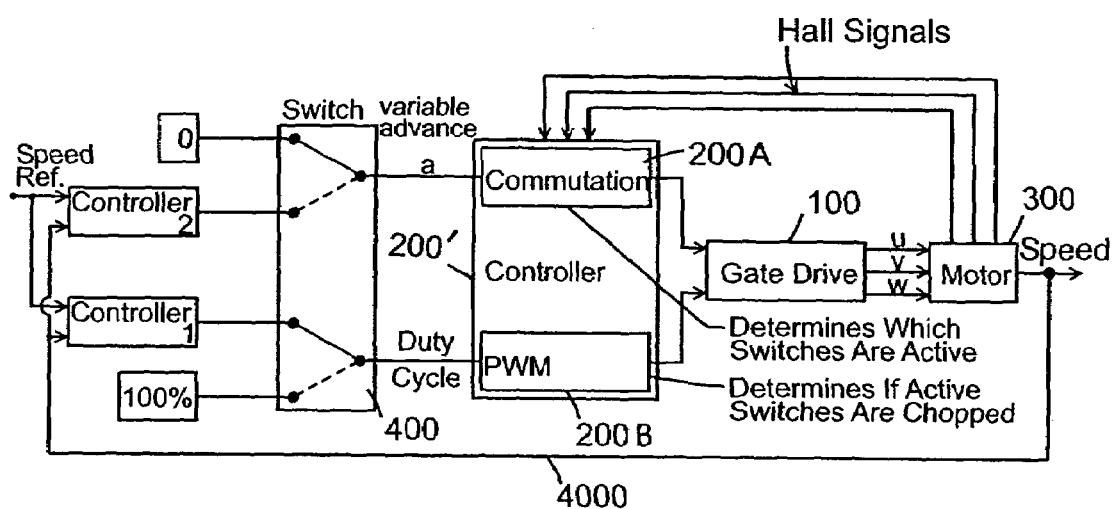
FIG. 6 shows a speed controller in accordance with the invention that selectively uses variable phase advance/conduction angle and pulse width modulation.

FIG. 6 shows a speed control utilizing the invention. At high loads, losses due to switching in the power devices of the converter are significant. Losses occur when the transistors and the diodes switch. Thus, there are significant losses when pulse width modulating. Due to these losses, instead of pulse width modulating, when variable advance is greater than 0, a full duty cycle (100% PWM) may be used. The speed controller as shown in FIG. 6 can be provided that leaves the duty cycle at 100% but varies variable advance a in order to regulate motor speed.

In FIG. 6, a gate drive comprising a converter 100 is provided which provides the three phases to the motor 300. The Hall signals are provided to a controller 200' which includes a commutator 200A and a pulse width modulator 200B. The commutator 200A is provided with a signal comprising the variable amount of advance a, either 0 or some amount of advance for motor control. The pulse width modulator 200B is provided with a signal controlling the duty cycle, either an amount of duty cycle less than 100% or 100%. Depending on conditions, a switch 400 provides a variable advance a equal to 0 or a variable advance from a controller 2 to the commutator. Switch 400 also provides a duty cycle comprising either the output of a controller 1 comprising a variable duty cycle or 100% duty cycle to the pulse width modulator, as shown. Switch 400 may be controlled by a software controller and could comprise a transistor switching circuit. Controllers 1 and 2 are provided with a speed reference signal (Speed Ref.) which determines the desired speed. A feedback signal 4000 is derived from the position sensor(s) and provided to the controllers 1 and 2 as an indication of the actual motor speed.

Controller 1 is used when the desired speed is reached with 120° conduction angle and less than 100% duty cycle.

If the current drawn by the motor is too high with 120° conduction and a 100% duty cycle, this scheme is also used. Thus, when controller 1 is used to vary the duty cycle, variable advance a equals 0 as shown in FIG. 6.

Controller 2 is used if the desired speed cannot be reached with 120° conduction angle and 100% duty cycle provided the current draw is not too high. Accordingly, when controller 2 is used, a variable advance a greater than 0 is provided to the commutator 200A with 100% pulse width modulation (full on during conduction angle).

Controller 1 may include both speed and current control. Hysteresis may be needed when switching between the two controllers.

The invention accordingly comprises a system for providing high efficiency motor control and higher operating speeds at any given torque, thereby increasing power. Further, the increased conduction angle reduces the torque ripple. For example, actual test results for a typical electric motor with 1 Nm of torque, show a 75% increase in current results in a 77% increase in motor speed. Table II shows some actual test results.

TABLE II

| | MOTOR SPEED (RPM) | |
|---|---|---|
| Load Torque (Nm) | 120 Conduction, 0 Phase Adv. | 180 Conduction, 60 Phase Adv. |
| 1.0 | 3360 | 5960 |
| 2.5 | 2530 | 3225 |

The forms of execution of the invention relating to a power steering system will now be explained in detail by referring to FIGS. 7–12.

Figure 7:
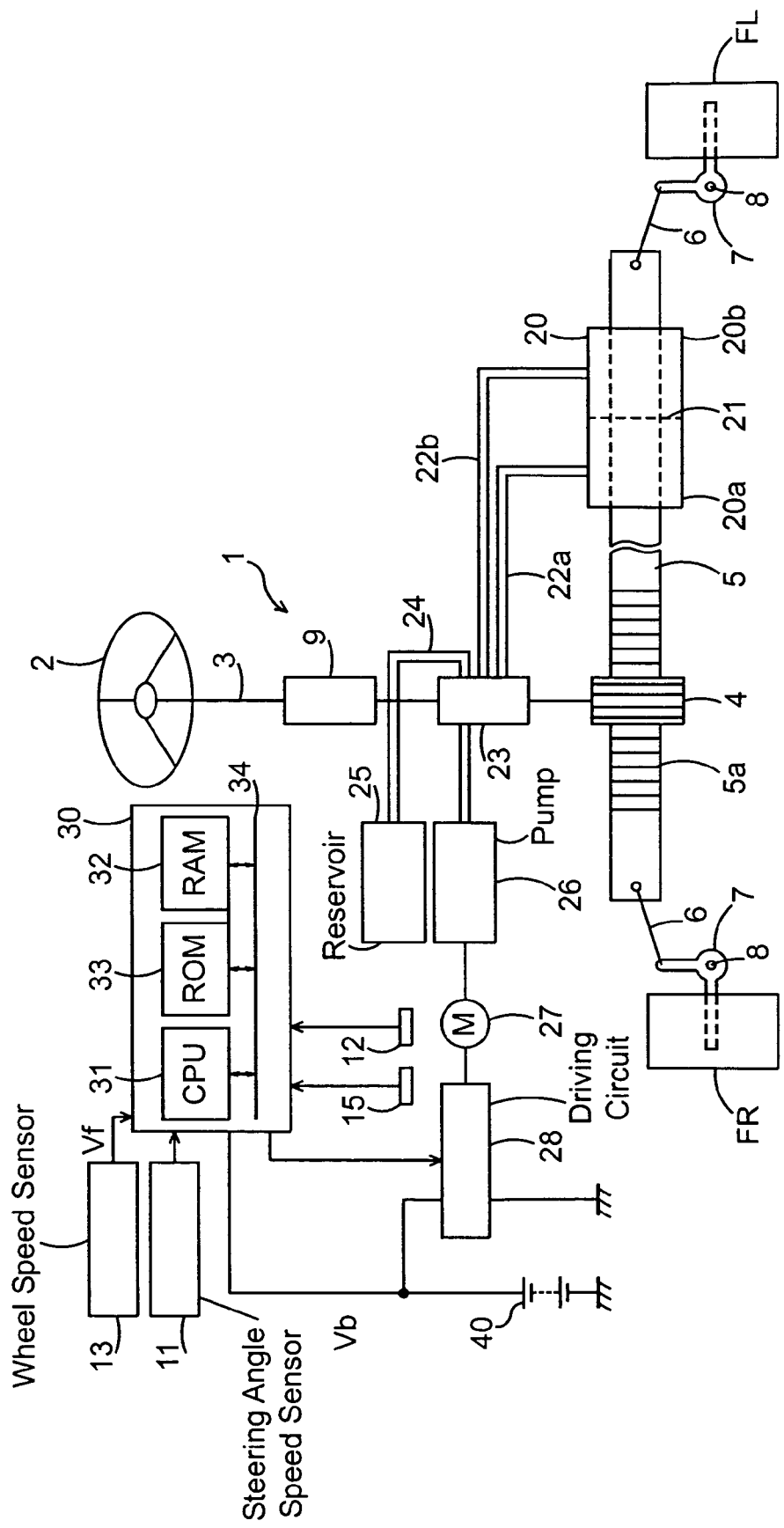
FIG. 7 is a conceptual drawing showing the basic constitution of a power steering device according to one example of this invention.

FIG. 7 is a conceptual figure indicating the basic constitution of a power steering device according to an example of this invention. This steering device is arranged relative to the steering mechanism 1 of the vehicle, with an auxiliary steering power being provided given to this mechanism 1.

The steering mechanism 1 comprises for example, a steering wheel 2 which is operated by the operator, a steering shaft 3 which is linked to this steering wheel 2, a pinion gear 4 coupled to the steering shaft 3, and a rack gear 5a which is engaged with the pinion gear 5, with a rack shaft 5 being extended in the right and left directions. At both ends of the rack axis 5, tie rods 6 are joined and the tie rods 6 are linked to a knuckle arm 7 that supports the wheels FL and FR at the right and at the left as steerable wheels. The knuckle arm 7 is provided in such a fashion as to revolve around the king pin 8. The above arrangement is exemplary only. Other forms of steering gears and other components can be provided, as known to those of skill in the art.

In the above-described construction, when the steering wheel 2 is operated and the steering shaft 3 is rotated, the rotation is converted into a linear movement along the right-left direction of the wheel by the pinion gear 4 and the rack shaft 5. This straight-line movement is converted into a revolution amount around the king pin of the knuckle arm 7, with the result that the steering of the right and left wheels FL and FR is achieved.

Into the steering shaft 3, a torsion bar 9 that produces torsion in conformity with the direction and the size of the steering torque that is added to the steering wheel 2 and an oil pressure control valve 23 whose opening changes in conformity with the direction and the size of the torsion of the torsion bar 9 are incorporated.

The oil pressure control valve 23 is connected to a power cylinder 20 that provides the auxiliary steering power to the steering mechanism 1. The power cylinder 20 has a piston 21 that is integrally provided on the rack shaft 5 and a pair of cylinder chambers 20a and 20b that have been divided by the piston 21. The cylinder chambers 20a and 20b are connected with the oil pressure control valve 23 through the oil supply and return routes 22a and 22b respectively.

The oil pressure control valve 23 is further provided on an oil circulation route 24 that passes through a reserve tank 25 and an oil pump 26. The oil pump 26 is driven by a motor M(27) of the electromotive type; it draws the operating oil which is stored in the reservoir tank 25 to supply same to the oil pressure control valve 23. The excess operating oil is returned to the reservoir tank 25 from the oil pressure control valve 23 through the oil circulation route 24.

The oil pressure control valve 23 supplies the operating oil to either the cylinder chamber 20a or cylinder chamber 20b of the power cylinder 20 through either the oil supply or return route 22a and 22b in the case where torsion is impressed to the torsion bar 9 in one direction. In the event that torsion is impressed to the torsion bar 9 in the other direction, further, it supplies the operating oil to the other of the cylinder chambers 20a and 20b through the other of the oil supply or return routes 22a and 22b.

In the case where no torsion or torsion is scarcely impressed to the torsion bar 9, the oil pressure control valve 23 will be in the so-called equilibrium state and the operating oil circulates in the oil circulation route 24 without being supplied to the power cylinder.

When the operating oil is supplied to either one of the cylinder chambers of the power cylinder 20, the piston 21 moves in the direction of the width of the steerable wheels. As a result, auxiliary steering power is impressed to the rack shaft 5.

Examples of the construction of the oil pressure control valve 23 are disclosed in detail in the Official Publication of Toku Kai Sho 59-118577, to cite an example.

The electric motor 27 consists, for example, of a triple-phase brushless motor and it is controlled by an electronic control unit 30 through a drive circuit 28. The drive circuit 28 comprises, for instance, a power transistor bridge circuit. It supplies electric power from a battery 40 as an electric power source to the electric motor 27 in accordance with the control signal that is provided by an electronic control unit 30.

The electronic control unit 30 includes a micro-computer which is activated upon receiving a power supply from the battery 40. This micro-computer comprises a CPU 31, a RAM 32 that provides the work area for the CPU 31, a ROM 33 that has memorized the data for control as well as the action program of the CPU 31, and a bus 34 for the mutual connection of the CPU 31, RAM 32 and ROM 33.

To the electronic control unit 30, steering angle data as outputted from the steering angle sensor 11 is provided. The steering angle sensor 11 is provided in relation to the steering wheel 2. By setting the steering angle of the steering wheel 2 at the time when the ignition switch is activated and the engine has started at the initial value "0", a steering angle data of the sign in conformity with the steering direction is outputted. On the basis of this steering data, the CPU 31 calculates the steering speed that corresponds to its time differential value.

An electric current detection signal from an electric current sensor 12 that detects the electric current that flows to the electric motor 27 and a detection signal from the Hall sensor 15 as a rotor position sensor for the detection of the rotor position of the electric power motor 27 are provided to the electronic control unit 30.

Moreover, a wheel speed signal that is outputted from the wheel speed sensor 13 is given to the electronic control unit 30. The wheel speed sensor 13 may be a sensor that directly detects the wheel speed (proportional to vehicle speed) or the wheel speed may be obtained by calculation on the basis of the output pulse of the wheel speed sensor that has been provided in relation to the wheel.

The electronic control unit 30 controls the electric power motor 27 on the basis of the steering angle data, the current data and the wheel speed data that are given from the steering angle sensor 11, the current sensor 12 and the wheel speed sensor 13 respectively.

Figure 8:
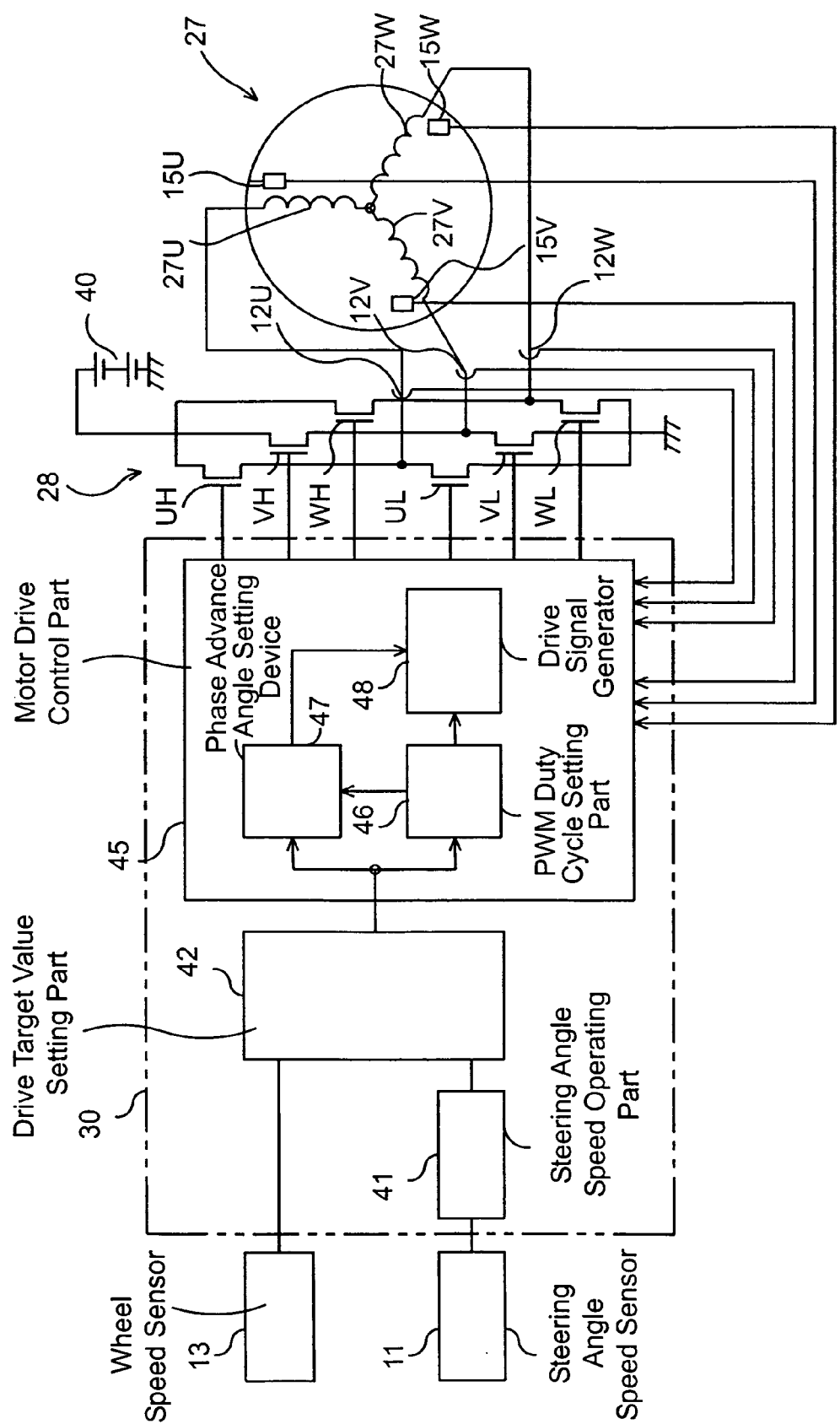
FIG. 8 is a block diagram showing the functional constitution of the electric control unit in the above-described power steering device.

FIG. 8 is a block diagram showing the construction of the electronic control unit as viewed from its functional standpoint. The electronic control unit 30 substantially possesses a plurality of functional means that are realized through the execution of a program stored in ROM 33 by the CPU 31. The electronic control unit 30 thus comprises a steering angle speed operating part 41 for the calculation of the steering angle speed on the basis of the output signal of the steering angle sensor 11 and a target rotary speed setting part 42 that sets the target rotary speed R of the electric motor 27 on the basis of the wheel speed as detected by the wheel speed sensor 13 as well as the steering angle speed calculated by the steering angle speed operating part 41.

In addition, the electronic control unit 30 is provided with a motor driving control part 45 that controls and drives the electric power motor 27 so as to achieve the target rotary speed R as set by the target rotary speed setting part 42. The motor drive control part 45 generates a drive signal for achieving the target rotary speed R on the basis of the motor electric current that is detected by the electric current sensor 12 and provides this drive signal to the drive circuit.

The electric motor 27 is provided with a stator that has a U-phase field coil 27U, a V-phase field coil 27V and a W-phase field coil 27W and a rotor with a fixed permanent magnet that receives a repulsion field from these field coils 27U, 27V and 27W, with the rotary angle of this rotor detected by the Hall sensor 15. The Hall sensor 15 comprises the Hall sensors 15U, 15V and 15W that have been provided in conformity with the U phase, the V phase and the W phase.

The current sensor 12 whose purpose it is to detect the electric current that flows to the electric motor 27 is equipped with electric current sensors 12U, 12V and 12W that detect the electric currents that flow to the U phase, the V phase and the W phase respectively. The output signals of the electric current sensors 12U, 12V and 12W and the Hall sensors 15U, 15V and 15W are suitably amplified and provided to the motor drive control part 45. Alternately, the current sensor 12 can be implemented as a single current sensor coupled to the DC bus.

The drive circuit 28 comprises a series circuit of a pair of field effect transistors UH and UL that correspond to the U phase, a pair of field effect transistors VH and VL that correspond to the V phase and a pair of field effect transistors WH and WL that correspond to the W phase coupled in parallel across the battery 40.

The U phase field coil 27U of the electric motor 27 is connected to a connecting point between the field effect transistor UH and UL, the V phase field coil 27 V is connected to a connecting point between the field effect transistors VH and VL and the W phase field coil 27W is connected to a connective point between the field effect transistors WH and WL.

The motor drive control part 45 brings the field effect transistors UH, VH and WH into the ON state in this order during a certain period of electric angle and, at the same time, controls the rotation of the electric motor 27 by providing a drive signal consisting of the PWM pulses for the electric field effect transistors UL, VL and WL.

In particular, the motor drive control part 45 comprises a PWM duty cycle setting part 46 for setting the PWM duty cycle corresponding to the target rotary speed R that is set up by the target rotary speed setting part 42, a phase advance angle setting part 47 for setting the phase advance angle $\Delta\theta$ which correspond to the target rotary speed that is set likewise by the target rotary speed setting part 42 and a drive signal producing part 48 that produces the drive signals to be given to the field effect transistors UH, UL, VH, VL, WH and WL of the drive circuit 28 on the basis of the phase advance angle $\Delta\theta$ that is set by the phase advance angle setting part 47 as well as the PWM duty cycles that are set by the PWM duty setting part 46.

Figure 9:
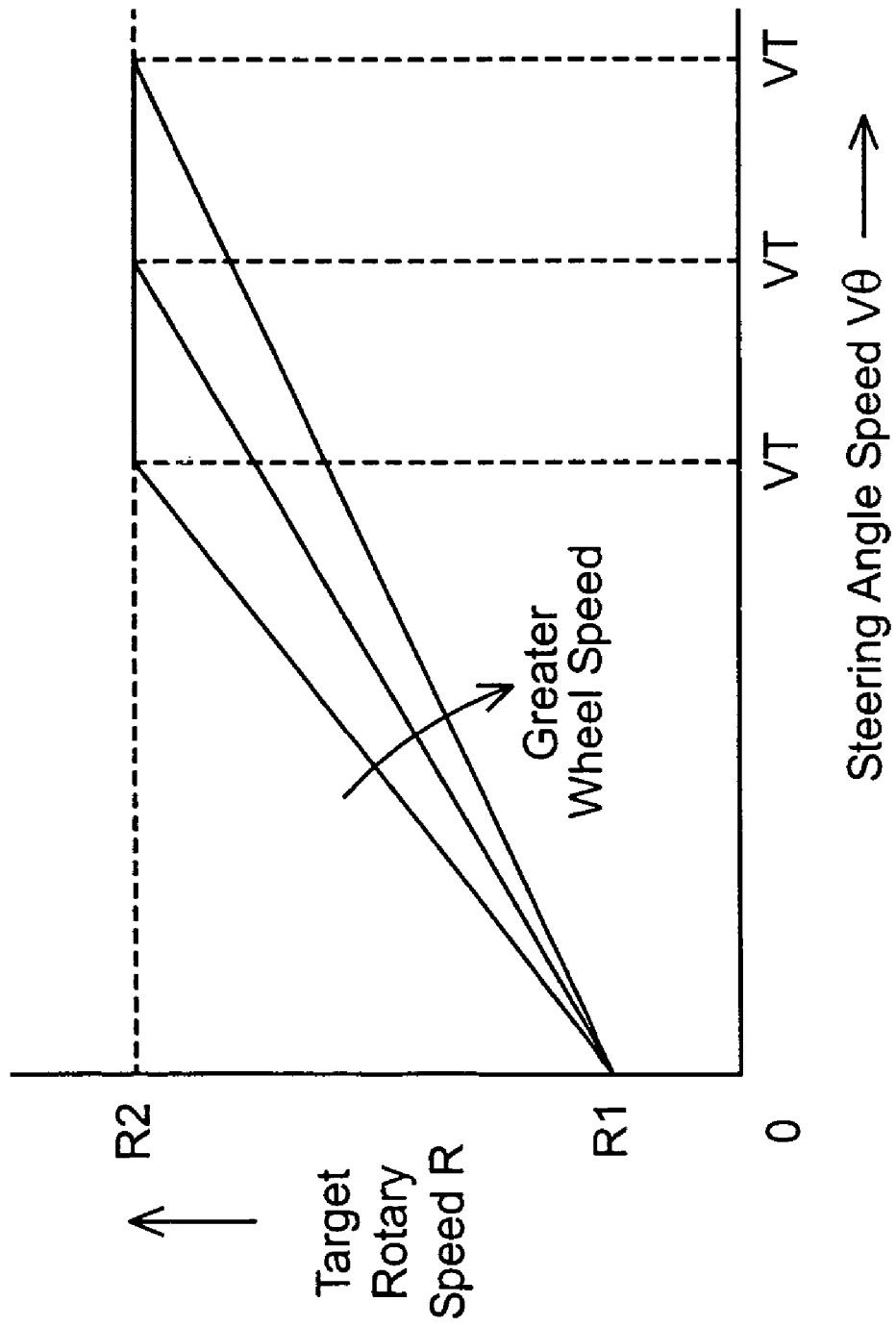
FIG. 9 is a characteristic chart showing the relationship between the steering angle speed and the target rotary speed.

FIG. 9 is a figure showing the relation between the steering angle speed and the target rotary speed as set by the target rotary speed setting part 42. The target rotary speed R is set between the lower limit R1 and the user limit R2 so that it will monotonously increase (the increase being linear in this form of execution) in the range of zero being no larger than V($\theta$), which is no larger than VT (VT being a threshold value) regarding the steering angle speed V($\theta$).

Figure 1:
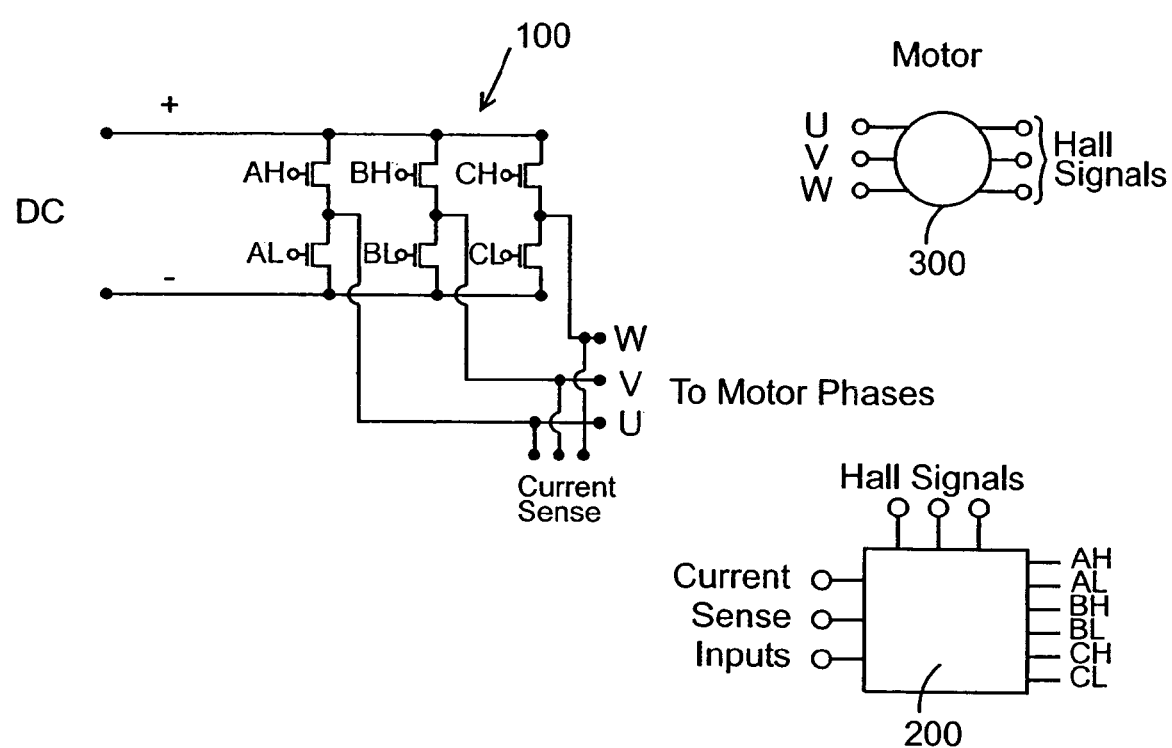
FIG. 1 shows a generalized block diagram of a motor controller.
Figure 2:
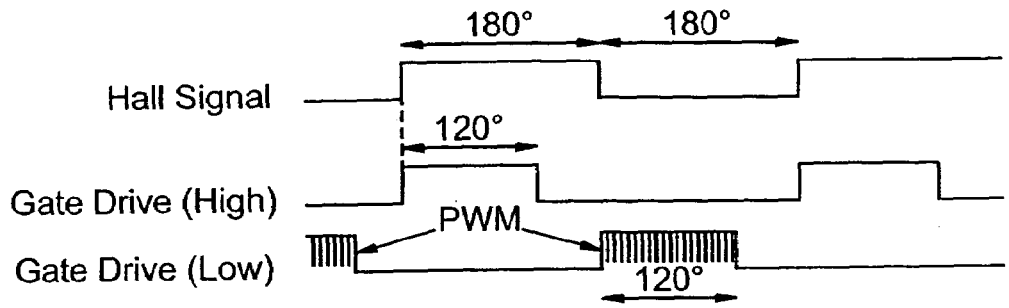
FIG. 2 shows a typical prior art motor drive control scheme.
Figure 3:
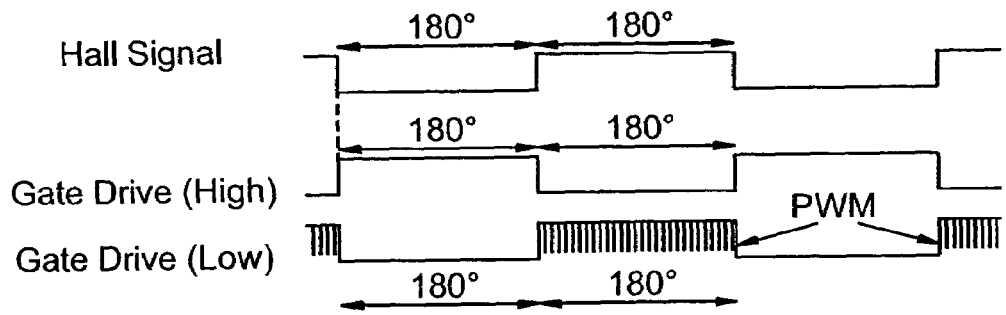
FIG. 3 shows another prior art motor drive control scheme.

The target rotary speed setting apart 42 variously sets the incline of the target rotary speed R as compared with the steering angle speed B($\theta$) on the basis of the wheel speed as is shown in FIG. 3. In other words, the threshold value VT is variously set in accordance with the wheel speed range. To be more specific, the threshold value is set higher when the wheel speed becomes higher, i.e., when the vehicle is moving faster. Accordingly, the target rotary speed R will be set lower as the wheel speed becomes higher, with a consequence that the auxiliary steering power becomes smaller. In this manner, wheel-speed responsive control is carried out for generating a suitable steering auxiliary power in conformity with the speed of the vehicle.

Figure 10:
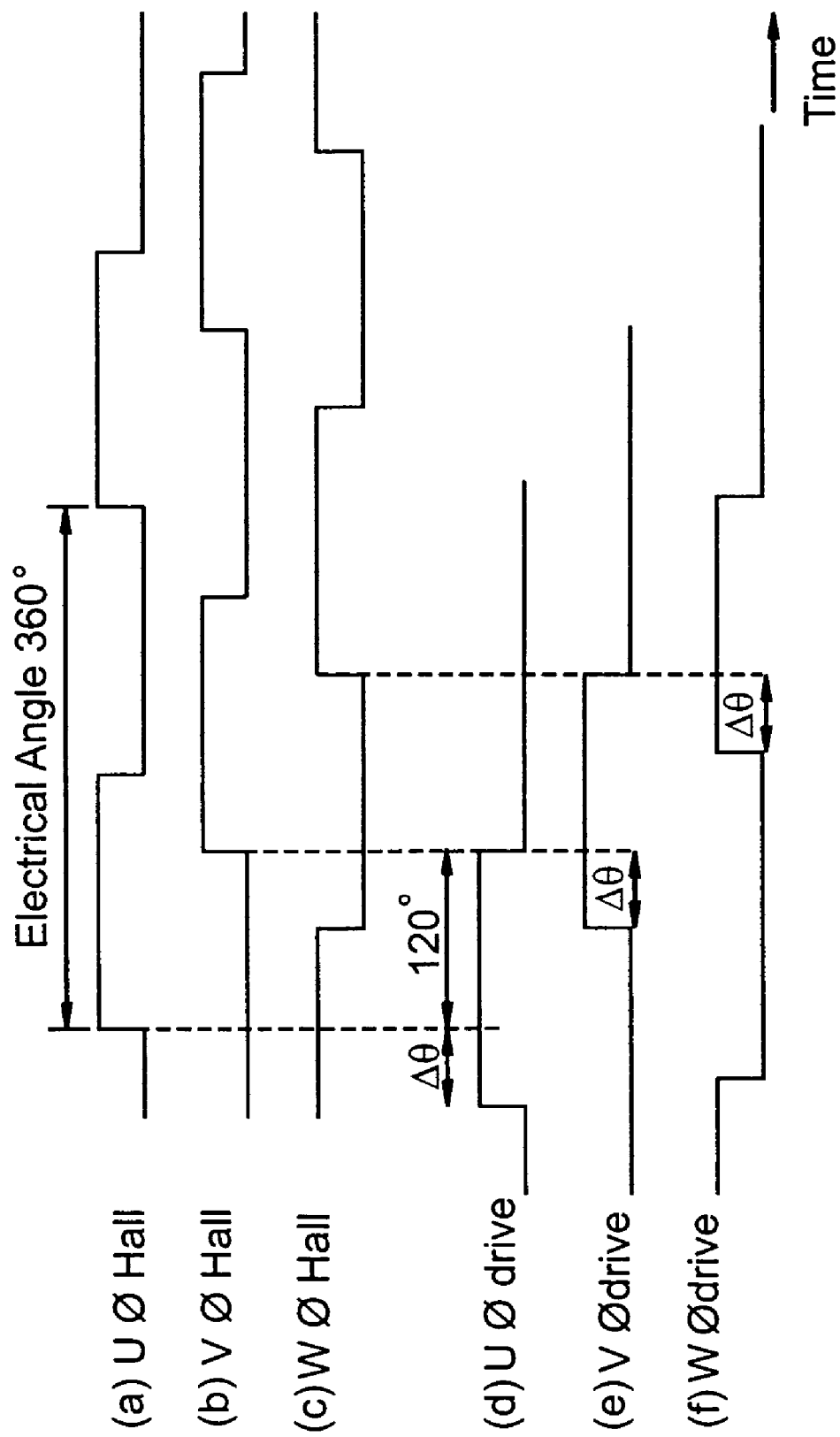
FIG. 10 is a chart shown for the purpose of explaining the power driving method for operating the electric motor.

FIG. 10 is a time chart presented for the purpose of explaining the method of passing the electric current for driving the electric motor 27. FIG. 10(a) shows the U-phase Hall signal that is outputted by the Hall sensor 15U and FIG. 10(b) shows the V-phase Hall signal that the Hall sensor 15V outputs. In addition, FIG. 10(c) shows the W-phase Hall signal that the Hall sensor 15W outputs.

Moreover, FIG. 10(d) shows the drive signal wave-form that is provided to the field effect transistor UH, FIG. 10(e) shows the waveform of the drive signal that is provided to the field effect transistor VH and FIG. 10(f) shows the drive signal waveform that is provided to the electric field effect transistor WH.

Along with the rotation of the electric motor 27, the U phase Hall signal, the V phase Hall signal and the W phase Hall signal assume the waveforms phase-delayed by an electric angle of 120 degrees each.

The drive signal producing part 48 produces the drive signals that basically follow the 120 degree power passing system. In other words, the drive signal that is provided to the field effect transistor UH rises in advance of the U-phase Hall signal and, after being held in an ON state only during the period of an electric angle obtained by adding the phase advance angle $\Delta\theta$ to 120 degrees, it is turned back to the OFF state in synchronization with a Hall signal. Likewise, the drive signal that is provided to the field effect transistor VH rises in advance of the rising edge of the V-phase Hall signal and, after being held in the ON state only during the period of the electric angle obtained by adding the phase advance angle $\Delta\theta$ to 120 degrees, it is turned to the OFF state in synchronization with a Hall signal.

The same can be stated about the drive signal of the field effect transistor WH and it rises to the ON state in advance of the leading edge of the W-phase Hall signal and, at the same time, it is kept in the ON state only during the period of the electric angle obtained by adding the phase advance angle $\Delta\theta$ to 120 degrees, followed by turn-back to the OFF state in synchronization with a Hall signal.

While these controls are being carried out, the pulse width control signal for the duty ratios set at the PWM duty setting part 46 is provided to the field effect transistors UL, VL and WL.

The phase advance angle setting part 47 is for setting the advance angle of the phase of the drive signal as compared with the Hall signal on the basis of the target rotary speed R. The phase advance angle setting part 47 sets the phase advance angle Δθ at zero insofar as the PWM duty setting part 46 sets a PWM duty of less than 100 percent. At this time, the drive signal producing part 48 produces a drive signal that follows the ordinary 120 degree conduction angle system.

When the PWM duty setting part 46 sets a 100 percent PWM duty and, accordingly, in the state where the electric passage due to the PWM control is saturated, the phase advance angle setting part 47 variously sets the phase advance angle Δθ in accordance with the target rotary speed R. At this time the drive signal producing part 48 brings the field effect transistor UH, VH and WH into the ON state at the timing where the phase has been advanced by the phase advance angle Δθ as compared with the Hall signal. As a consequence, the power passing (conduction angle) time will become the time that corresponds to 120 degrees plus Δθ, with the power passing time becoming longer by the time corresponding to the phase advance angle Δθ.

In order to bring the drive signals of the U phase, the V phase and the W phase into the ON state at the timing which is ahead by the phase advance angle Δθ as compared with the Hall signal, it is only necessary to set the ON timing of the drive signal of the W phase, the U phase and the V phase by using the rolling signal one cycle before.

Figure 11:
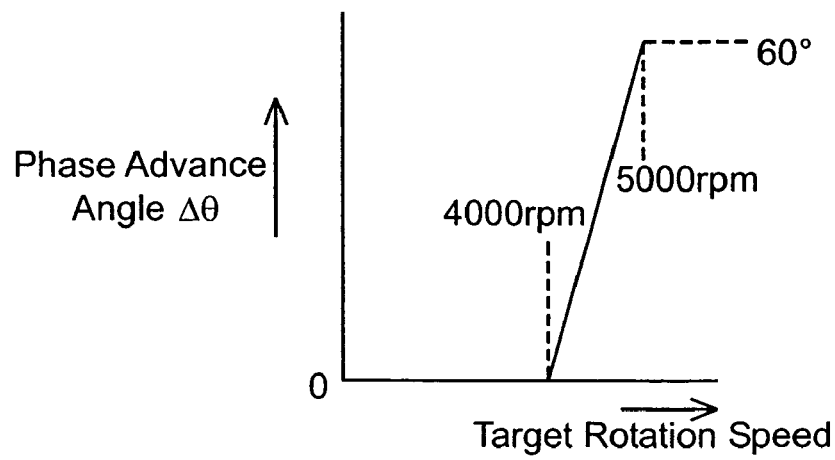
FIG. 11 is a figure showing the relationship between the phase advance angle and the target rotary speed.

FIG. 11 shows the relationship between the phase advance angle Δθ that is set by the phase advance angle setting part 47 and the target rotary speed R that is set by the target rotary speed setting part 42. Let us assume an example where the PWM duty setting part 46 sets a 100 percent PWM duty at the target rotary speed of 4,000 rpm, with the highest rotary speed of the electric power motor 27 required being 5,000 rpm. In this case, the phase advance angle setting part 47 sets the phase advance angle Δθ in such a way as to monotonously increase from zero to 60 degrees in the target rotary speed R region between 4,000 rpm and 5,000 rpm.

The phase advance angle Δθ may be set in such a fashion as will increase linearly along with an increase in the target rotary speed R or the change in the phase advance angle Δθ as compared with the target rotary speed r may become a non-linear change. It is desirable that the upper limit of the phase advance angle Δθ be set at 60 degrees. If a phase advance angle Δθ that exceeds 60 degrees is set, the field effect transistors UH, UL, VH, VL, WH and WL are set on simultaneously, thereby damaging the power element of the drive circuit 28 (field effect transistors UH, UL, VH, VL, WH and WL).

Figure 12:
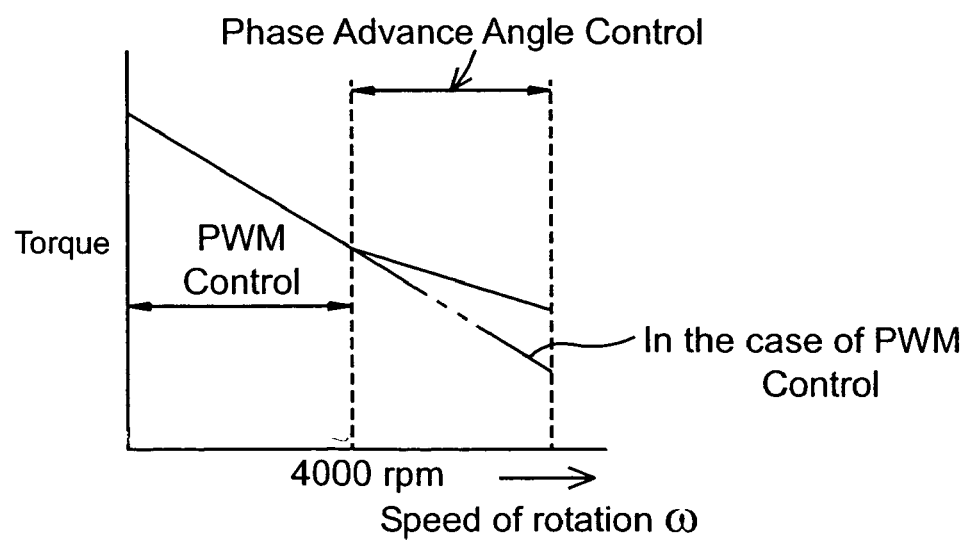
FIG. 12 is characteristics figure showing the relationship of the torque versus the rotary speed of the electric motor.
Figure 13:
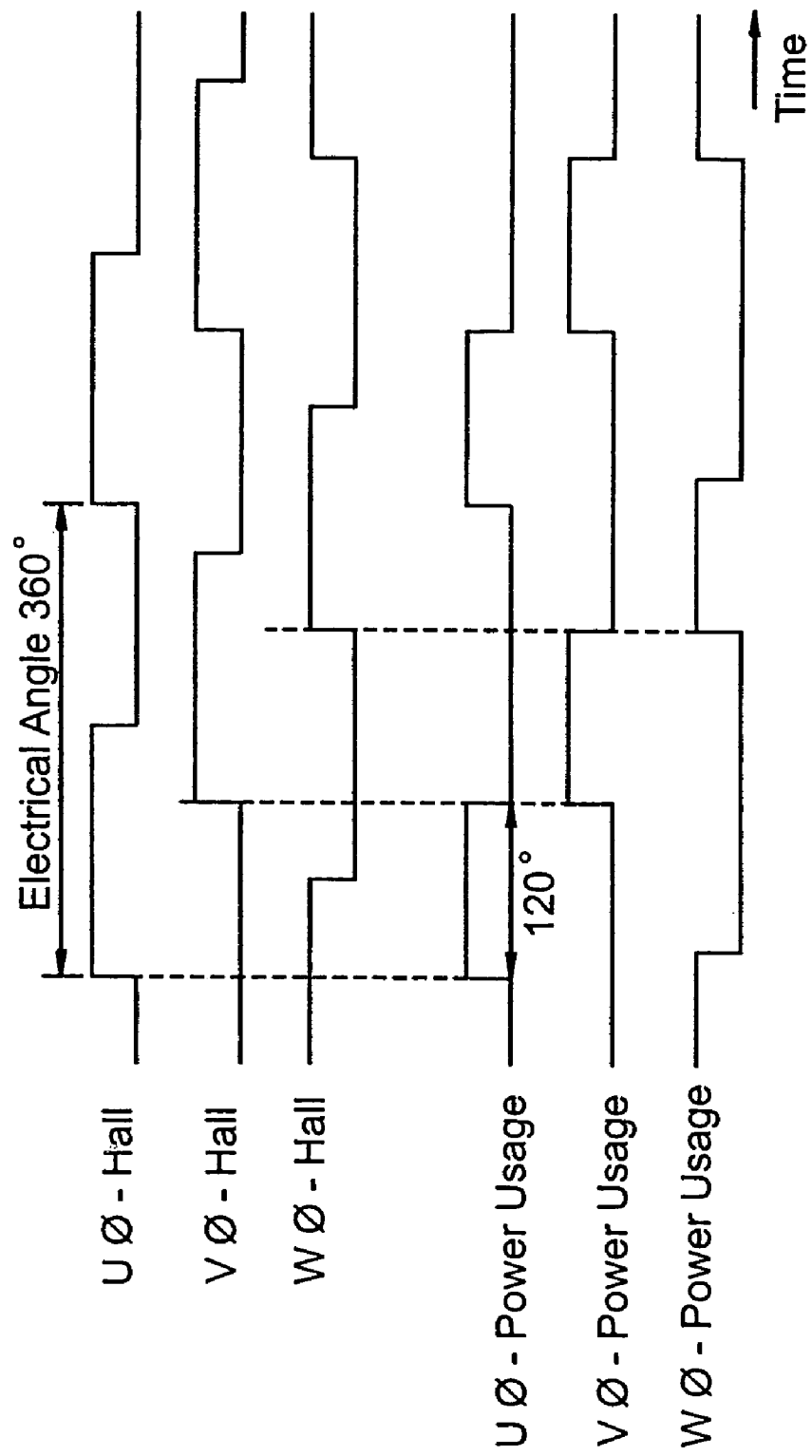
FIG. 13 is a time chart presented for the purpose of explaining the conventional 120 degree conduction angle system.
Figure 14:
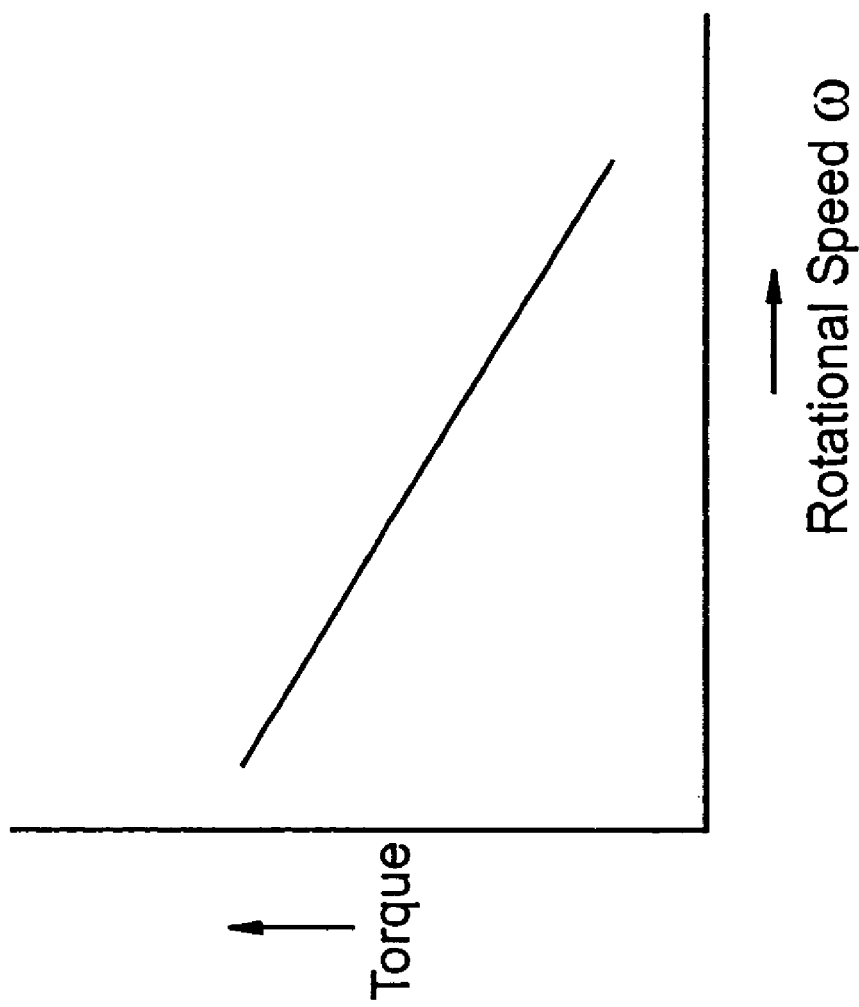
FIG. 14 is a drawing showing the relationship between the rotary speed and the output torque in the three-phase brushless motor.

FIG. 12 is a characteristic figure showing the relation of the torque against the rotary speed of the electric motor 27. As has been shown in Formula (1) above, when the rotary speed ω increases, the motor electric current I is reduced due to the motor generated induced voltage kω that is produced thereby, with a result that the torque that is proportional to this motor current decreases.

In this form of execution, while the rotation of the electric power motor 27 is controlled by the PWM control in the low and medium speed rotary ranges up to 4,000 rpm, the PWM duty is at 100 percent in the medium high rotation range higher than 4,000 rpm, with the rotation of the electric power motor 27 being controlled by the phase advance angle control. As a result, the power passing time becomes longer by the portion of the phase advance angle Δθ in the medium high speed range where phase advance angle control is carried out, with a result that the actual magnetic flux density decreases and the motor generation induced voltage at the high speed rotation becomes small. Thus, it becomes possible to obtain a high rotational speed in the medium low torque range as is shown in FIG. 6.

According to this form of execution which is shown above, it becomes possible to increase the rotational speed in the medium low torque range by means of well-contrived control without changing the design or specifications of the electric motor 27. Accordingly, it becomes possible to obtain auxiliary steering power without bringing about a drastic increase in the manufacturing costs.

In view of the fact that a phase advance angle Δθ which is satisfactory in conformity with the target rotary speed R is set without setting the phase advance angle Δθ at a fixed value, it becomes possible to minimize the problems that may arise in the case where excessive phase advance angle control has been carried out (the problem involving a decline in magnetism and efficiency of the motor in the case where the phase advance angle control volume has been increased).

As compared with the case where, while the phase advance angle (Δ)(θ) is fixed at a certain value, PWM control is carried out during the period where the phase advance angle Δθ constant, heat loss can be prevented and also the heat design of the drive circuit becomes easier to carry out, as it will not be necessary to take the switching loss of the field effect transistors into consideration.

A form of the execution of this invention has been explained above. However, the invention can be implemented in other forms as well. Even though, in the above-described form of execution, PWM control was conducted in the low medium speed rotary range, with the phase advance angle control being conducted in the medium high speed rotary range, it is also possible to carry out the phase advance angle control only in the high speed rotation range.

Moreover, various design modifications can be made within the range of the items that have been described above.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method for controlling an electric motor powered from a direct current bus, the motor having at least one sensor output for determining a switching instant for a switch of a switching converter controlling a conduction angle determining a conduction time during a revolution of the motor, the method comprising:
   receiving the sensor output;
   advancing a switching-on time of a switch of the switching converter connecting a d-c bus voltage from the direct current bus to a motor phase drive input by a phase angle prior to the next sensor output determining the switching instant; and
   controlling the speed of the motor by changing the amount of the phase.

2. The method of claim 1, further comprising increasing the conduction angle by the amount of said phase angle.

3. The method of claim 1, wherein the phase angle comprises a fixed phase angle amount and a variable phase angle amount controllable by a controller to control the speed of the motor.

4. The method of claim 3, wherein the variable phase angle increases the conduction angle and the fixed phase angle shifts the conduction time temporally.

5. The method of claim 1, further comprising pulse width modulating the switch during the conduction angle.

6. The method of claim 3, wherein two alternately conducting switches arranged in a half bridge are provided and further comprising advancing a switching-on time of each switch by the phase angle.

7. The method of claim 6, wherein the motor is a three phase motor and three half bridges are provided, each comprising two alternately conducting switches, one comprising a high side switch and the other a low side switch and further comprising advancing a switching-on time of each switch by the phase angle.

8. The method of claim 7, wherein the conduction angle varies between 120° and 180°, and the variable phase angle varies between 0° and 60°.

9. The method of claim 8, wherein the fixed phase angle advance equals approximately 15°.

10. The method of claim 3, wherein the fixed phase angle is provided so that a turn-off instant for the switch is aligned with a transition of the sensor output independently of the amount of conduction angle.

11. The method of claim 1, further comprising pulse width modulating during the conduction angle at a duty cycle of 100%.

12. The method of claim 1, further comprising selecting between the two following options a) and b) to control the motor speed:
   (a) varying the phase angle and 100% duty cycle pulse width modulation during the conduction angle; and
   (b) zero phase angle and varying the duty cycle by pulse width modulation during the conduction angle.

13. The method of claim 12, further comprising selecting option b) if a desired speed can be reached at a 120° conduction angle and less than 100% duty cycle.

14. The method of claim 12, further comprising selecting option b) if a current drawn by the motor exceeds a predetermined limit with 120° conduction angle and 100% duty cycle.

15. The method of claim 12, further comprising selecting option a) if a desired motor speed cannot be reached with 120° conduction angle and 100% duty cycle and the current drawn by the motor is below a predetermined limit.

16. A motor speed control regulator for controlling an electric motor powered from a direct current bus, the regulator comprising:
   a switching converter selectively switching a dc bus voltage from the direct current bus for powering the motor;
   a controller for controlling a switching operation of the converter, an on-time of each switch of the converter determining the conduction angle, the controller having at least one input from at least one sensor providing a sensor signal related to a rotational position of the rotor of the motor;
   the controller changing the phase angle at which each switch of the converter switches on in response to the sensor signal such that each switch switches on at a phase angle in advance of the sensor signal, the amount of the phase angle advance controlling the motor speed.

17. The motor speed control regulator of claim 16, further wherein the controller includes a pulse width modulator for modulating the converter output during the conduction angle.

18. The motor speed control regulator of claim 17, further wherein the controller is operable to perform speed control of the motor by selecting between the following two options a) and b):
   (a) varying the phase angle and 100% duty cycle pulse width modulation during the conduction angle; and
   (b) zero phase angle and varying the duty cycle of pulse width modulation during the conduction angle.

19. The motor speed control regulator of claim 18, wherein the controller is operable to select option b) if a desired speed can be reached at a 120° conduction angle and less than 100% duty cycle.

20. The motor speed control regulator of claim 18, wherein the controller is operable to select option b) if a current drawn by the motor exceeds a predetermined limit with 120° conduction angle and 100% duty cycle.

21. The motor speed control regulator of claim 18, wherein the controller is operable to select option a) if a desired motor speed cannot be reached with 120° conduction angle and 100% duty cycle and the current drawn by the motor is below a predetermined limit.

22. The motor speed control regulator of claim 16, wherein the phase angle increases the conduction angle by the amount of the phase angle.

23. The motor speed control regulator of claim 16, wherein the phase angle comprises a fixed phase angle amount and a variable phase angle amount controllable to control the speed of the motor.

24. The motor speed control regulator of claim 23, wherein the variable phase angle increases the conduction angle and the fixed phase angle shifts the on-time temporally.

25. The motor speed control regulator of claim 16, wherein the motor is a three phase motor and the converter comprises three half bridges, each comprising two alternately conducting switches, one comprising a high side switch and the other a low side switch.

26. The motor speed control regulator of claim 25, wherein the motor is a brushless three phase DC motor.

27. The motor speed control regulator of claim 16, wherein the conduction angle varies between 120° and 180° and the variable phase angle varies between 0° and 60°.

28. The motor speed control regulator of claim 23, wherein the fixed phase angle is provided so that a turn-off instant for each switch is aligned with a transition of the sensor output independently of the amount of conduction angle.

* * * * *